(12) United States Patent
Lloyd

(10) Patent No.: US 10,251,346 B2
(45) Date of Patent: Apr. 9, 2019

(54) TOP FURLING AUTOMATED RETRACTABLE GREENHOUSE COVER

(71) Applicant: Emerald Kingdom Greenhouse, LLC, Redding, CA (US)

(72) Inventor: Jeffrey Lloyd, Weaverville, CA (US)

(73) Assignee: EMERALD KINGDOM GREENHOUSE, LLC, Redding, CA (US)

( * ) Notice: Subject to any disclaimer, the term of this patent is extended or adjusted under 35 U.S.C. 154(b) by 0 days.

(21) Appl. No.: 15/588,415

(22) Filed: May 5, 2017

(65) Prior Publication Data

US 2017/0238477 A1 Aug. 24, 2017

Related U.S. Application Data

(63) Continuation of application No. 14/644,203, filed on Mar. 11, 2015, now Pat. No. 9,642,315.

(51) Int. Cl.
*A01G 9/16* (2006.01)
*E04F 10/06* (2006.01)
*A01G 9/22* (2006.01)

(52) U.S. Cl.
CPC .............. *A01G 9/16* (2013.01); *A01G 9/22* (2013.01); *A01G 9/227* (2013.01); *E04F 10/0614* (2013.01); *Y02A 40/254* (2018.01); *Y02A 40/258* (2018.01)

(58) Field of Classification Search
CPC .......... A01G 9/16; A01G 9/227; A01G 9/242; A01G 13/0206; A01G 13/04; E04B 1/34363; E04B 7/163; E04B 9/227; E04F 10/06; E04F 10/0603; E04F 10/0607

USPC ............ 47/17, 22.1, 29.5; 135/88.11, 88.15, 135/88.16, 124, 117, 157, 136, 120.4, 135/132, 133, 907; 160/66, 67, 72, 80,
(Continued)

(56) References Cited

U.S. PATENT DOCUMENTS

| 544,871 A | 8/1895 | Turner | |
| 1,408,424 A * | 2/1922 | Grebler | E04F 10/0614 160/293.1 |

(Continued)

FOREIGN PATENT DOCUMENTS

| CA | 2647667 A1 * | 6/2010 | .......... E04F 10/0614 |
| DE | 1582759 A1 * | 7/1970 | ............. A01G 9/227 |

(Continued)

*Primary Examiner* — Magdalena Topolski
*Assistant Examiner* — Morgan T Barlow
(74) *Attorney, Agent, or Firm* — Knobbe, Martens, Olson & Bear, LLP

(57) ABSTRACT

Top furling automated retractable greenhouse cover is a retractable cover for a greenhouse that is mounted on top of the greenhouse. Top furling automated retractable greenhouse cover comprises: a spine clamp, a left furling cover assembly, a right furling cover assembly, a hinge pin assembly, and an electrical control box. Left and right furling assemblies each comprise a curtain or cover, a furling rod, a furling motor, and a support arm. Electrical control box sends electronic signals to cause left and right covers or curtains to furl above the greenhouse when retracted and to unfurl down to the ground when extended to cover the greenhouse. The top-mounted design allows efficient use of gravity to apply tension to the furled rolls.

33 Claims, 11 Drawing Sheets

(58) Field of Classification Search
USPC ........ 160/81, 71, 243; 52/3, 23, 64, 66, 222, 52/DIG. 12, DIG. 14
See application file for complete search history.

(56) References Cited

U.S. PATENT DOCUMENTS

| | | | | |
|---|---|---|---|---|
| 1,549,037 | A * | 8/1925 | Williams | E04F 10/0614 160/65 |
| 1,689,131 | A | 10/1928 | Goodwin | |
| 1,929,903 | A | 10/1933 | Schindler | |
| 3,324,869 | A * | 6/1967 | Duda | B60P 3/343 135/140 |
| 3,722,571 | A * | 3/1973 | Knight | E04F 10/0614 135/88.11 |
| 3,789,903 | A * | 2/1974 | Clark | B60P 3/343 135/140 |
| 3,918,511 | A * | 11/1975 | Upton, Jr. | B60P 3/343 135/88.12 |
| 4,064,648 | A | 12/1977 | Cary | |
| 4,155,504 | A * | 5/1979 | Caldwell | A01G 9/241 236/49.5 |
| 4,348,833 | A | 9/1982 | Nagoya | |
| 4,387,533 | A | 6/1983 | Green | |
| 4,555,865 | A * | 12/1985 | di Monteforte | A01G 9/22 47/17 |
| 4,724,882 | A * | 2/1988 | Wang | E04F 10/0614 135/117 |
| 4,858,395 | A * | 8/1989 | McQuirk | E04B 1/94 135/903 |
| 4,874,196 | A * | 10/1989 | Goldstein | B60J 7/085 160/71 |
| 5,038,517 | A | 8/1991 | Talbott | |
| 5,212,903 | A | 5/1993 | Talbott | |
| 5,238,287 | A * | 8/1993 | Haddad, Jr. | B60J 7/085 160/71 |
| 5,278,749 | A * | 1/1994 | De Man | A01G 25/16 137/624.13 |
| 5,564,234 | A | 10/1996 | Vermeulen | |
| 5,829,200 | A | 11/1998 | Jones et al. | |
| 6,260,308 | B1 | 7/2001 | Looney | |
| 6,260,908 | B1 * | 7/2001 | Fraula | E04F 10/0603 135/88.12 |
| 6,324,792 | B1 | 12/2001 | DeGarie | |
| 6,474,718 | B1 * | 11/2002 | Henning | B60J 7/085 296/98 |
| 6,487,821 | B1 | 12/2002 | Thomsen et al. | |
| 6,513,856 | B1 * | 2/2003 | Swanson | B60J 7/085 296/100.15 |
| 6,752,193 | B1 * | 6/2004 | Molloy | B60J 5/14 160/310 |
| 6,893,071 | B2 * | 5/2005 | Chabot | B60J 7/085 160/71 |
| 7,188,889 | B2 * | 3/2007 | Wagner | B60P 3/343 135/88.11 |
| 8,132,583 | B2 * | 3/2012 | Mowatt, Sr. | E04F 10/0603 135/117 |
| 8,397,787 | B1 | 3/2013 | Daus et al. | |
| 8,413,385 | B2 | 4/2013 | Mahoney | |
| 8,496,283 | B1 * | 7/2013 | Schmeichel | B60J 7/085 296/100.16 |
| 8,695,281 | B2 | 4/2014 | Dondurur | |
| 9,212,503 | B1 | 12/2015 | Mentch | |
| 9,241,447 | B2 | 1/2016 | Looney | |
| 9,642,315 | B2 | 5/2017 | Lloyd | |
| 2004/0035059 | A1 | 2/2004 | Meyer et al. | |
| 2005/0067119 | A1 | 3/2005 | Schoonen | |
| 2005/0103371 | A1 * | 5/2005 | Childres | A45B 23/00 135/97 |
| 2006/0032592 | A1 * | 2/2006 | Hicks | E04F 10/0614 160/66 |
| 2007/0256796 | A1 | 11/2007 | Wedin | |
| 2011/0027055 | A1 | 2/2011 | Nunley | |
| 2011/0048651 | A1 * | 3/2011 | Goth | E04F 10/0614 160/22 |
| 2013/0235558 | A1 * | 9/2013 | Zhou | B05B 1/202 362/96 |
| 2014/0157662 | A1 | 6/2014 | Wallace | |
| 2015/0007509 | A1 * | 1/2015 | Digmann | B65G 69/008 52/173.2 |

FOREIGN PATENT DOCUMENTS

| | | | | |
|---|---|---|---|---|
| DE | 2339266 | A1 * | 2/1975 | ............ A01G 9/227 |
| DE | 3106918 | A1 * | 9/1982 | ............ A01G 9/227 |
| DE | 4222757 | A1 * | 1/1993 | ............ A01G 9/227 |
| EP | 0114649 | A2 * | 8/1984 | ............ B60P 3/343 |
| EP | 1438891 | A1 * | 7/2004 | ............ A01G 9/225 |
| FR | 2303135 | A1 * | 10/1976 | .......... E04F 10/0603 |
| FR | 2431827 | A1 * | 2/1980 | ............ A01G 9/227 |
| FR | 2484194 | A1 * | 12/1981 | ............ A01G 9/227 |
| FR | 2488777 | A1 * | 2/1982 | .............. A01G 9/16 |
| FR | 2494957 | A1 * | 6/1982 | ............ A01G 9/227 |
| FR | 2668195 | A1 * | 4/1992 | ............ A01G 9/242 |
| FR | 2700234 | A1 * | 7/1994 | ............ A01G 9/242 |
| GB | 1511244 | A * | 5/1978 | ............ A01G 9/227 |
| JP | 2001081922 | A * | 3/2001 | ......... E04F 10/0614 |
| WO | WO 0060192 | A1 * | 10/2000 | ............ A01G 9/225 |
| WO | WO 2007148976 | A1 * | 12/2007 | ............ A01G 9/225 |
| WO | WO 2014205522 | A1 * | 12/2014 | .......... E04F 10/0633 |

* cited by examiner

TOP FURLING AUTOMATED RETRACTABLE GREENHOUSE COVER

This application is a continuation of U.S. patent application Ser. No. 14/644,203, titled TOP FURLING AUTOMATED RETRACTABLE GREENHOUSE COVER, and filed Mar. 11, 2015, the entire disclosure of which is hereby expressly incorporated by reference herein.

BACKGROUND OF THE INVENTION

1. Field of the Invention

This invention relates to a retractable cover or curtain for a greenhouse and specifically to a top furling automated retractable cover or curtain for a greenhouse that retracts onto two rolls, each adjacent to and parallel to the ridge line of the roof and the greenhouse.

2. Description of Related Art

A greenhouse is a building in which plants are grown. Growing plants in a building is advantageous because the interior of a building can be sheltered from the exterior to allow for easier climate control of the interior in a manner that is more conducive to plant growth. Typically, the roof and walls of a greenhouse are made of impermeable and transparent or translucent material. The transparent or translucent aspect of the material allows light and energy from the sun to penetrate the roof and walls of the greenhouse in order to shine light and energy onto the plants and interior of the greenhouse. Light and energy are used to grow the plants as is required with the photosynthesis process and are also used to heat the interior of the greenhouse as light and energy are absorbed by the plants and interior of the greenhouse to radiate heat inside the greenhouse. The impermeable aspect of the material acts to shelter the plants and interior of the greenhouse from outside weather such as wind, rain, sleet, snow, and the like, to retain the radiated heat from the interior of the greenhouse, and to retain evaporated water vapor within the interior of the greenhouse for plant watering recycling.

There are instances where it is desirable to extend a special cover or curtain over the existing impermeable and transparent or translucent material of a greenhouse. When exterior temperatures are lower than optimal for plant growth, an insulated cover can be used to help retain more heat within the interior of the greenhouse, thereby keeping optimal growth temperatures for longer periods of time. When exterior temperatures are higher than optimal for plant growth, a solar shade cover can be used to block or reduce the amount of light and energy passing into the interior of the greenhouse, which in turn helps reduce the interior temperature of the greenhouse. In order to control the growth stage of the plants, a completely opaque cover can be used to block out all light and energy from passing through the greenhouse at certain times of day to artificially change the length of day perceived by the plants, which designates certain growth cycles within the plants.

There also instances where it is desirable to retract the special cover or curtain from covering the greenhouse and/or to retract the existing impermeable and transparent or translucent material from covering the greenhouse. When the interior temperatures of the greenhouse are higher than optimal, the insulated cover can be removed to help release more heat from the interior of the greenhouse, thereby keeping optimal growth temperatures for longer periods of time. When the interior temperatures of the greenhouse are lower than optimal, the solar shade cover can be removed to increase the amount of light and energy passing into the interior of the greenhouse, which in turn helps increase the interior temperature of the greenhouse. In order to provide maximum air ventilation for the plants, all coverings and barriers could be removed from the roof and walls of the greenhouse. In order to provide maximum heat loss through radiation into the outside air, all coverings and barriers could be removed from the roof and walls of the greenhouse.

This invention is a retractable greenhouse cover that can be used to reversibly extend a cover or curtain over the roof and sidewalls of a greenhouse in order to provide an insulated cover and/or a solar shade cover for the greenhouse. In addition, the retractable greenhouse cover of this invention can be used to reversibly extend the impermeable and transparent or translucent material over the frame of the greenhouse in order to install and retract all covering from the roof and sidewalls of the greenhouse. There are other retractable greenhouse covers in the prior art, but none that use a top-furling dual-awning mechanism that can reversibly extend any type of cover or curtain material over the roof and sidewalls of a greenhouse as shown and described here.

BRIEF SUMMARY OF THE INVENTION

In is an aspect of top furling automated retractable greenhouse cover to reversibly extend a cover or curtain over the roof and sidewalls of an existing greenhouse.

In is an aspect of top furling automated retractable greenhouse cover to provide two furlable covers or curtains, where each cover or curtain includes a furling and unfurling mechanism to furl and unfurl the curtain or cover.

It is an aspect of each furling mechanism to reversibly wind a cover or curtain into a roll that is positioned above the roof of the greenhouse, with the roll adjacent and parallel to the longitudinal ridge of the roof of the greenhouse.

In is an aspect of each furling mechanism to reversibly unwind a cover or curtain from the roll position above the roof of the greenhouse to the ground. It is an aspect of each furling mechanism to include a furling rod and a furling motor.

In is an aspect of each cover or curtain to be a sheet of flexible material with one end rigidly attached to the longitudinal ridge of the roof of the greenhouse and the opposite end rigidly attached to the furling rod of the furling mechanism.

It is an aspect of each furling mechanism for gravity to provide tension between the attached end on the roof of the greenhouse and the furled roll at the other end.

It is an aspect of each furling mechanism to provide smooth and reliable furling and unfurling of a cover or curtain over a greenhouse with straight sidewalls.

In is an aspect of each cover or curtain to be permeable or impermeable.

In is an aspect of each cover or curtain to be transparent, translucent, or opaque.

In is an aspect of each cover or curtain to be insulated or uninsulated. In is an aspect of top furling automated retractable greenhouse cover to include an electrical control box that is in electrical continuity with each furling motor and a power source.

In is an aspect each furling mechanism to be electronically controlled by the control box to extend or unfurl at certain times of day.

In is an aspect each furling mechanism to be electronically controlled by the control box to extend or unfurl under certain environmental conditions such as temperature, humidity, wind, precipitation, etc.

In is an aspect each furling mechanism to be electronically controlled by the control box to retract or furl at certain times of day.

In is an aspect each furling mechanism to be electronically controlled by the control box to retract or furl under certain environmental conditions such as temperature, humidity, wind, precipitation, etc.

DEFINITION LIST

Figure 1:
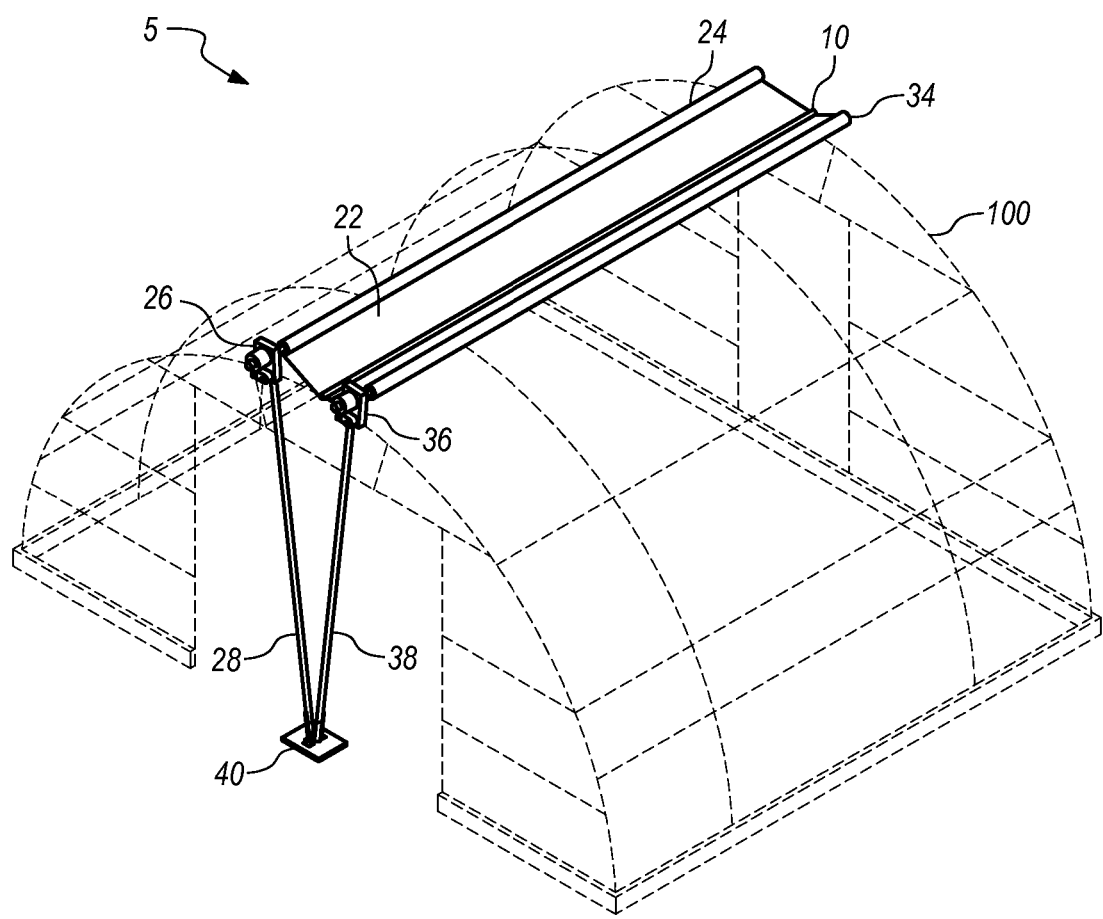
FIG. 1 is a perspective view of top furling automated retractable greenhouse cover installed over a Quonset or rounded sidewall greenhouse with the cover or curtain fully retracted and furled.
Figure 2:
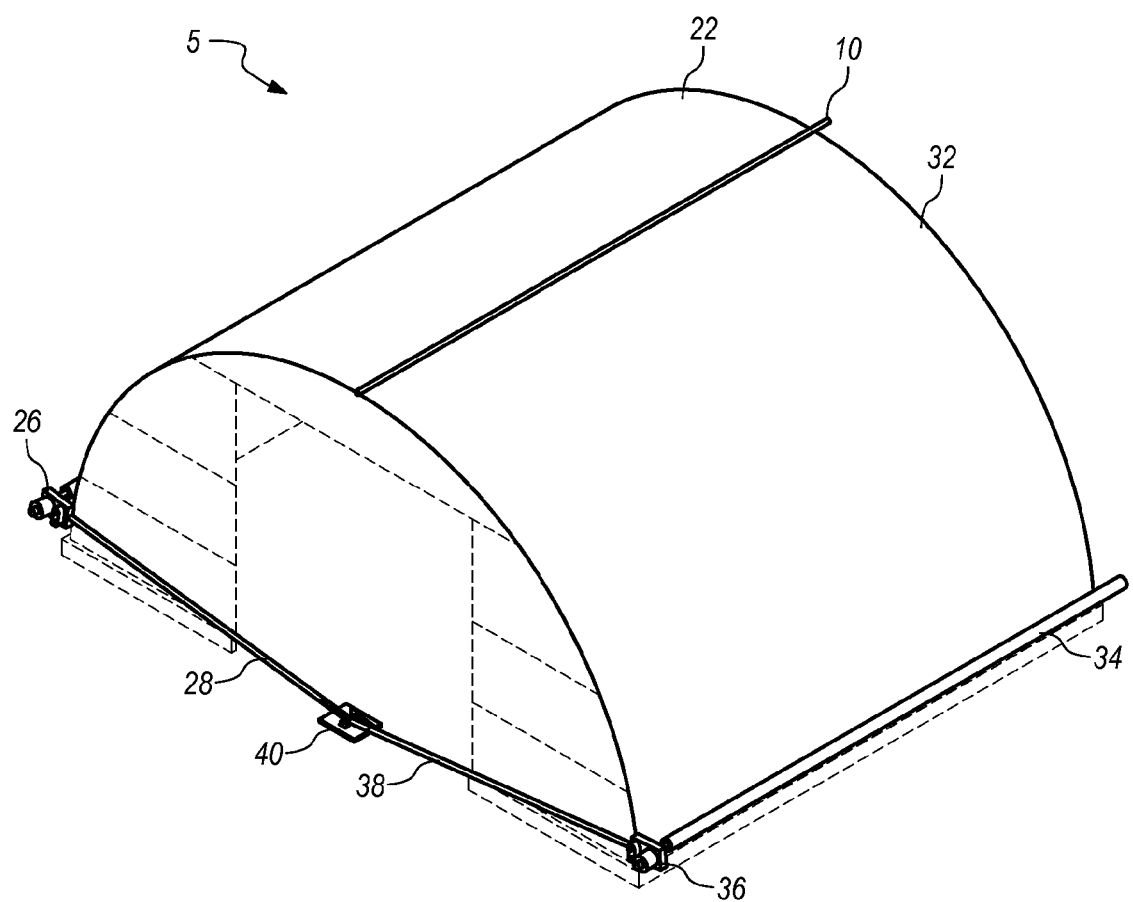
FIG. 2 is a perspective view of top furling automated retractable greenhouse cover installed over a Quonset or rounded sidewall greenhouse with the cover or curtain fully extended and unfurled.
Figure 3:
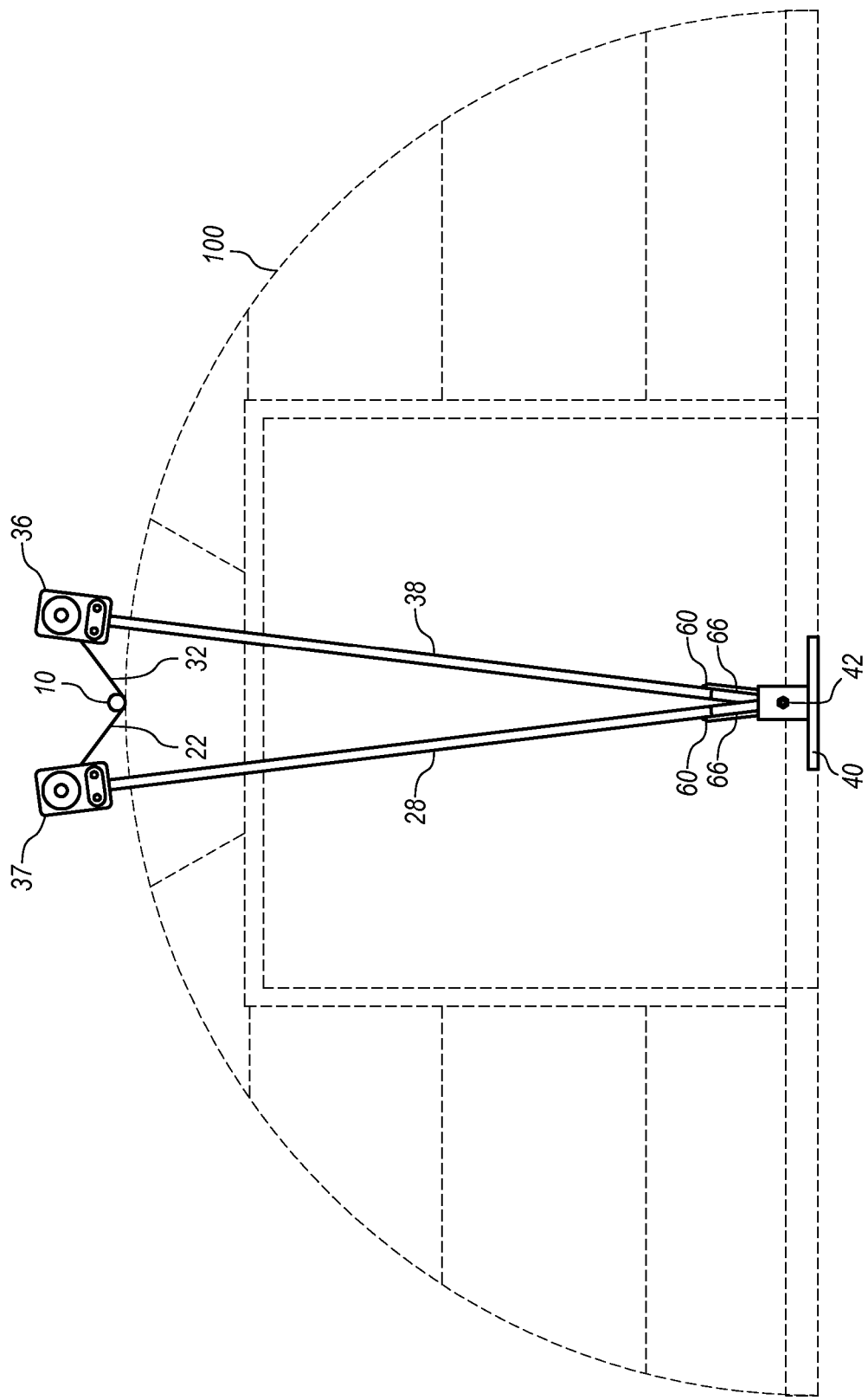
FIG. 3 is a front elevation view of top furling automated retractable greenhouse cover installed over a Quonset or rounded sidewall greenhouse with the cover or curtain fully retracted and furled.
Figure 4:
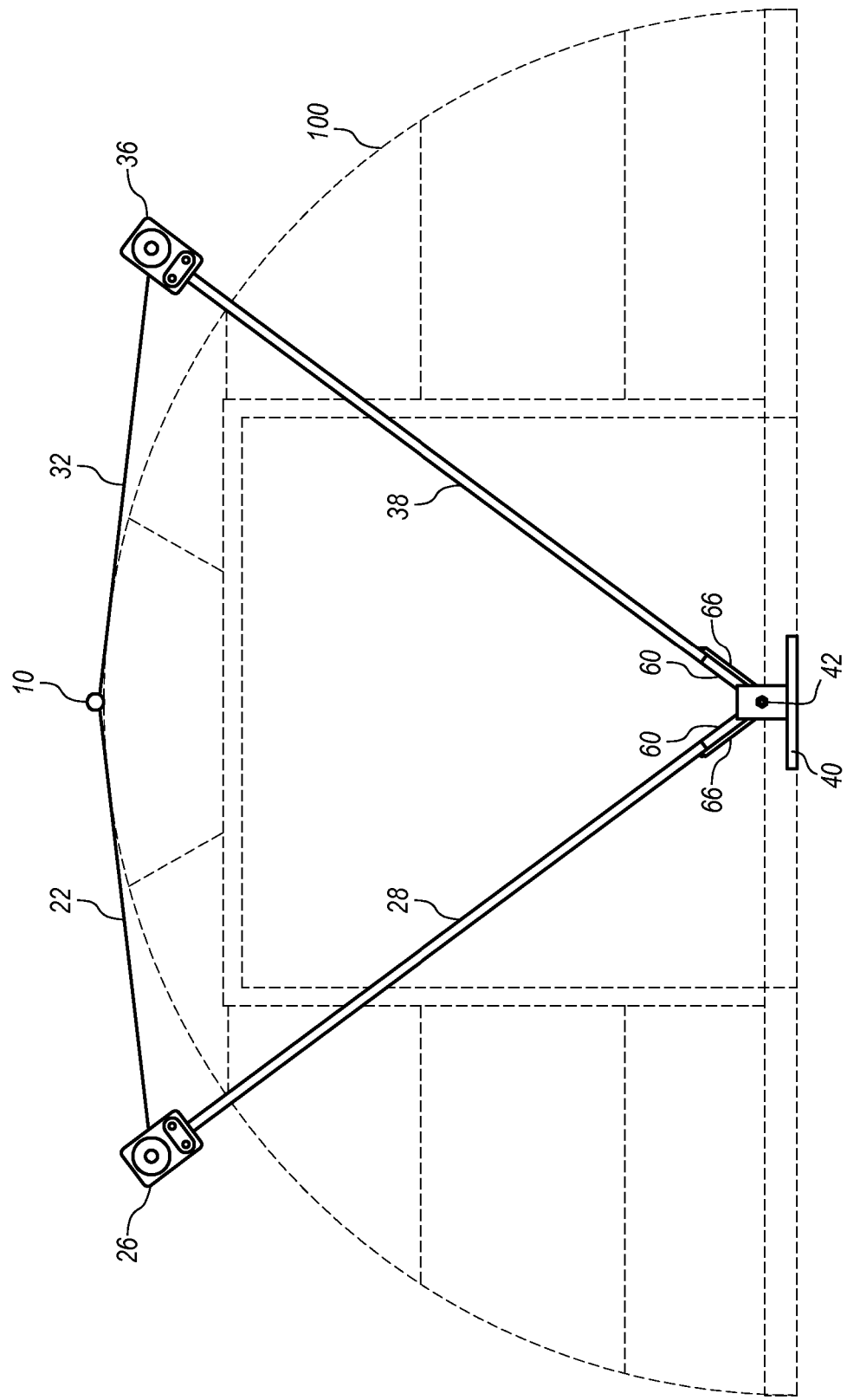
FIG. 4 is a front elevation view of top furling automated retractable greenhouse cover installed over a Quonset or rounded sidewall greenhouse with the cover or curtain partially extended and unfurled.
Figure 5:
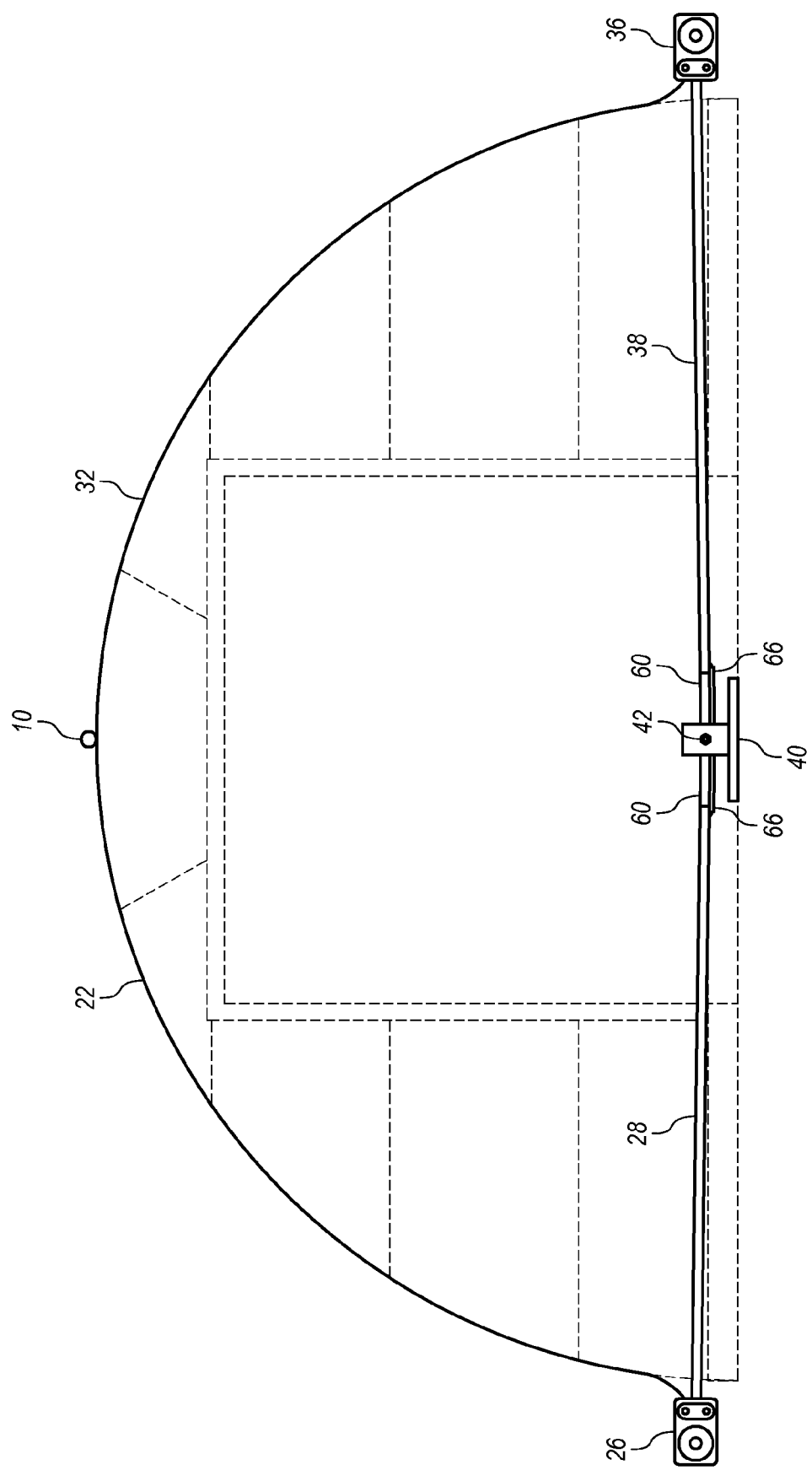
FIG. 5 is a front elevation view of top furling automated retractable greenhouse cover installed over a Quonset or rounded sidewall greenhouse with the cover or curtain fully extended and unfurled.
Figure 6:
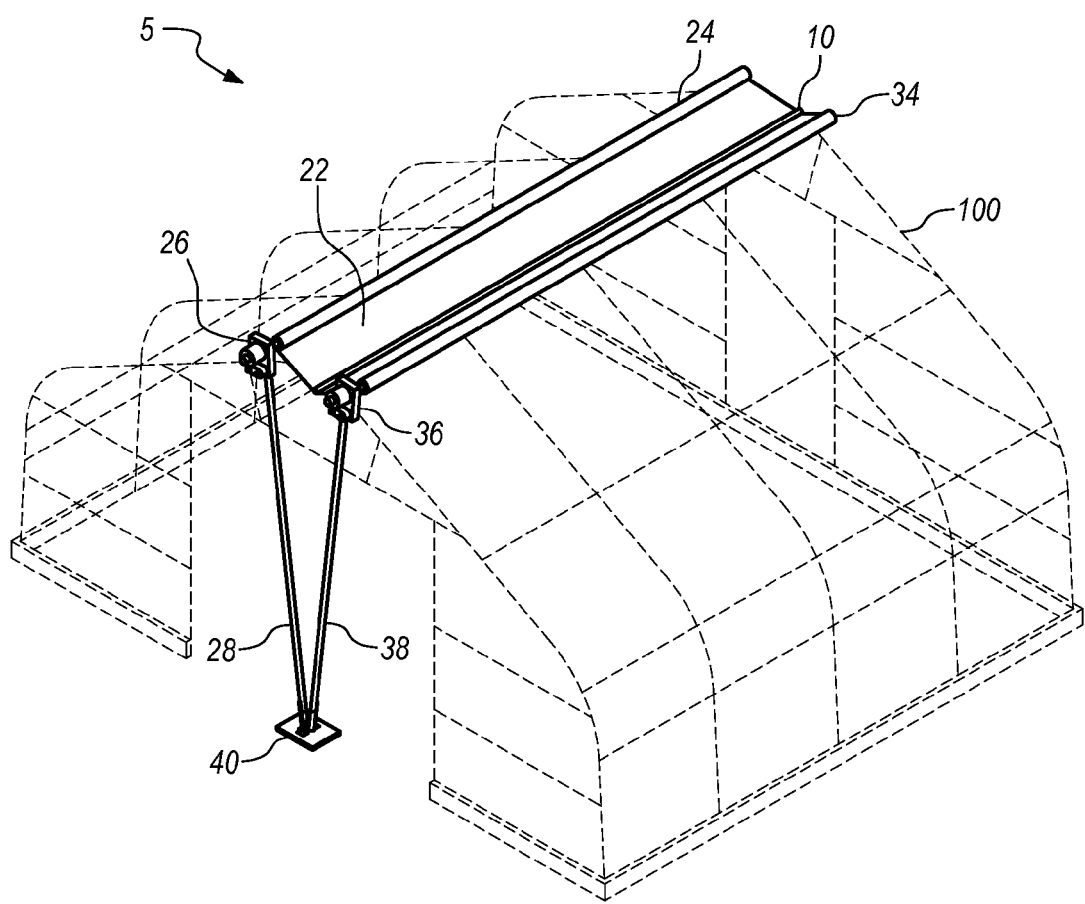
FIG. 6 is a perspective view of top furling automated retractable greenhouse cover installed over a Semi-Gabled or straight sidewall greenhouse with the cover or curtain fully retracted and furled.
Figure 7:
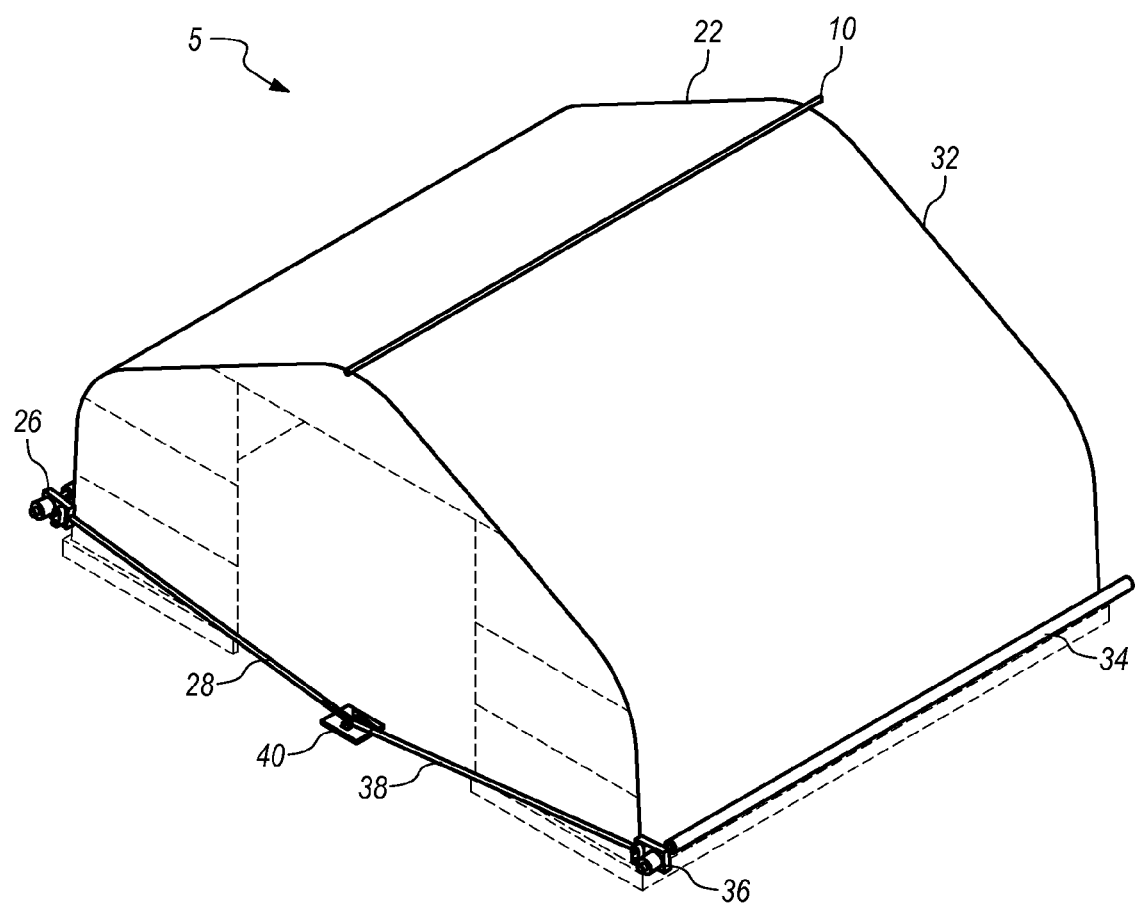
FIG. 7 is a perspective view of top furling automated retractable greenhouse cover installed over a Semi-Gabled or straight sidewall greenhouse with the cover or curtain fully extended and unfurled.
Figure 8:
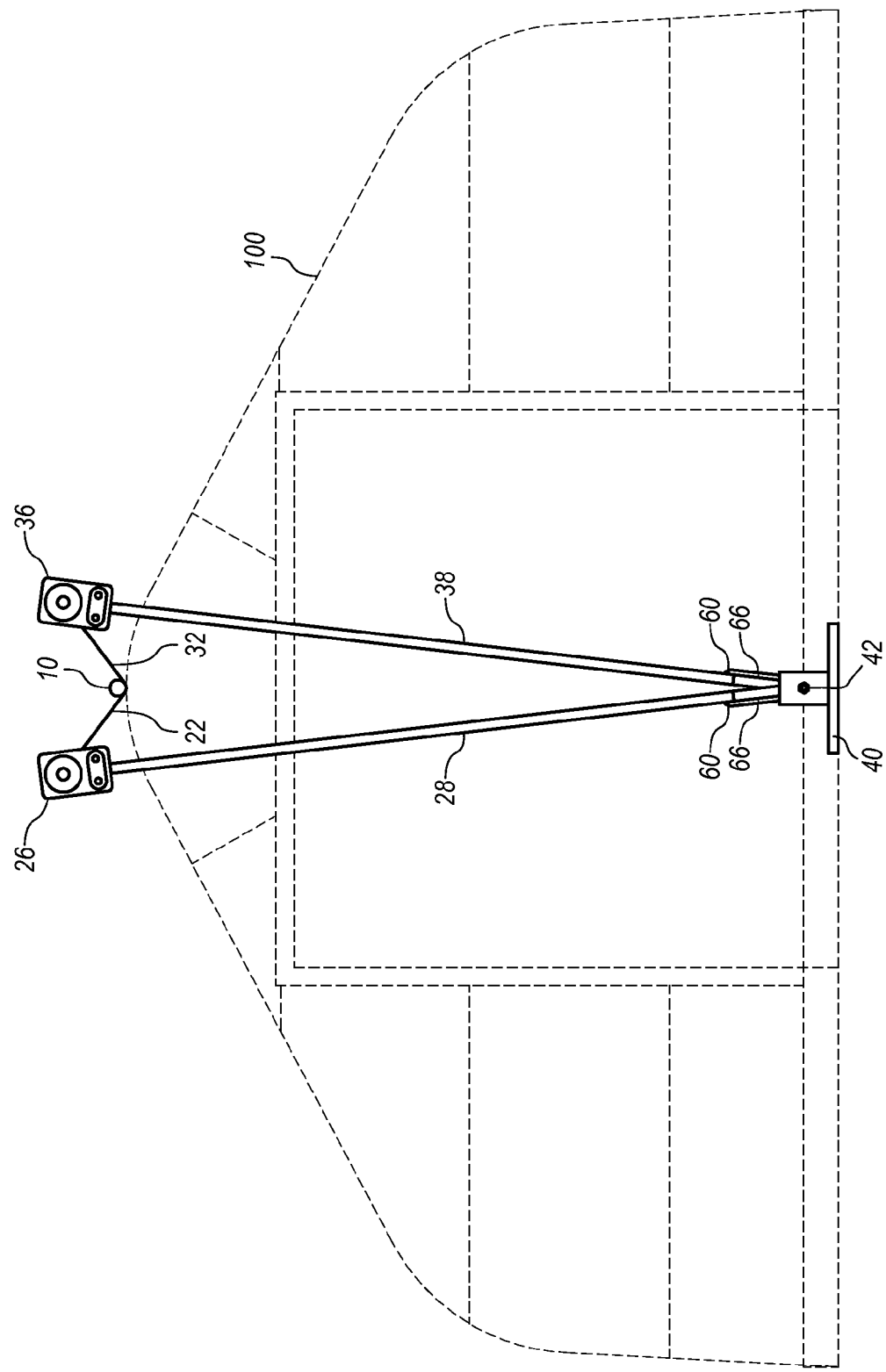
FIG. 8 is a front elevation view of top furling automated retractable greenhouse cover installed over a Semi-Gabled or straight sidewall greenhouse with the cover or curtain fully retracted and furled.
Figure 9:
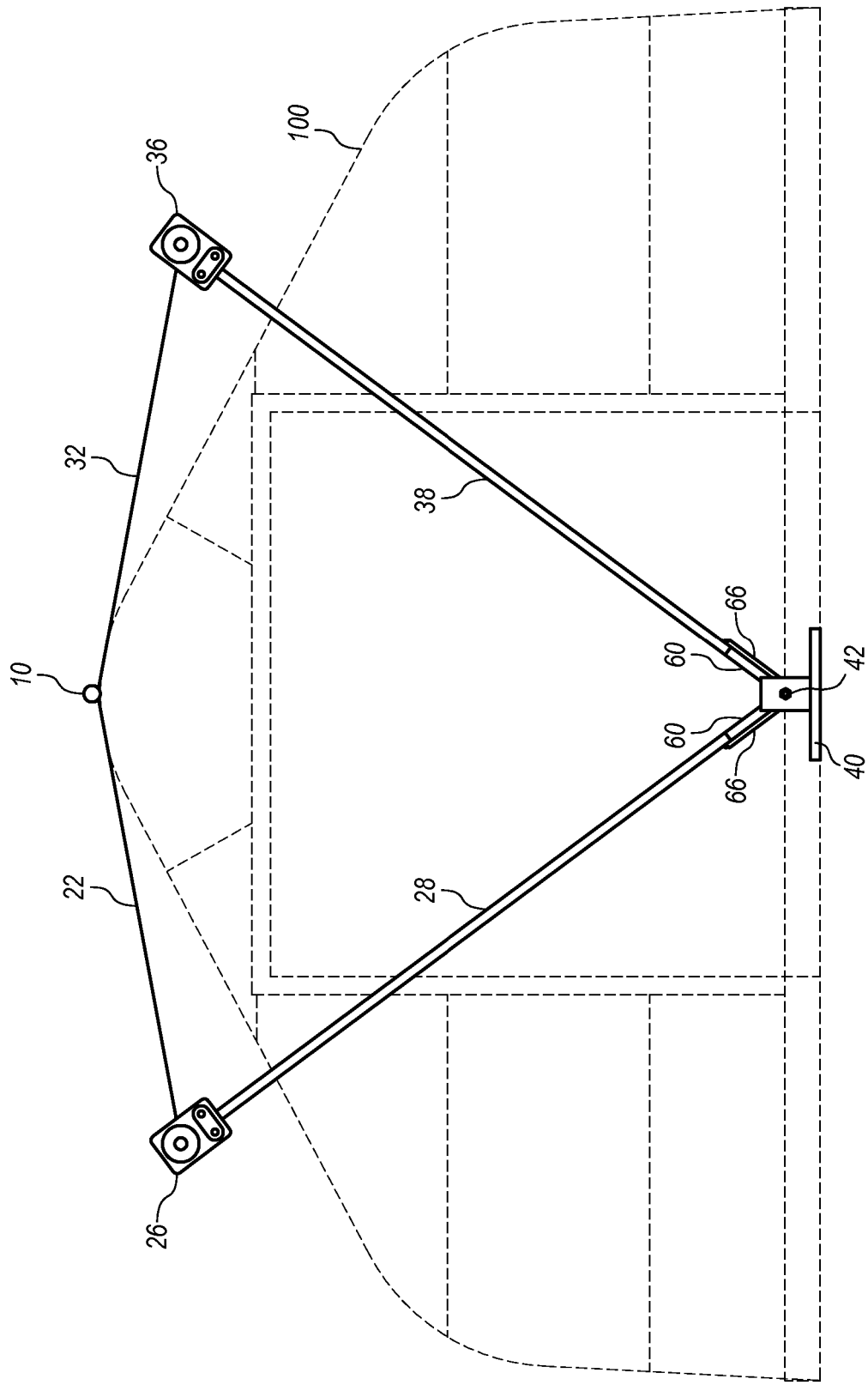
FIG. 9 is a front elevation view of top furling automated retractable greenhouse cover installed over a Semi-Gabled or straight sidewall greenhouse with the cover or curtain partially extended and unfurled.
Figure 10:
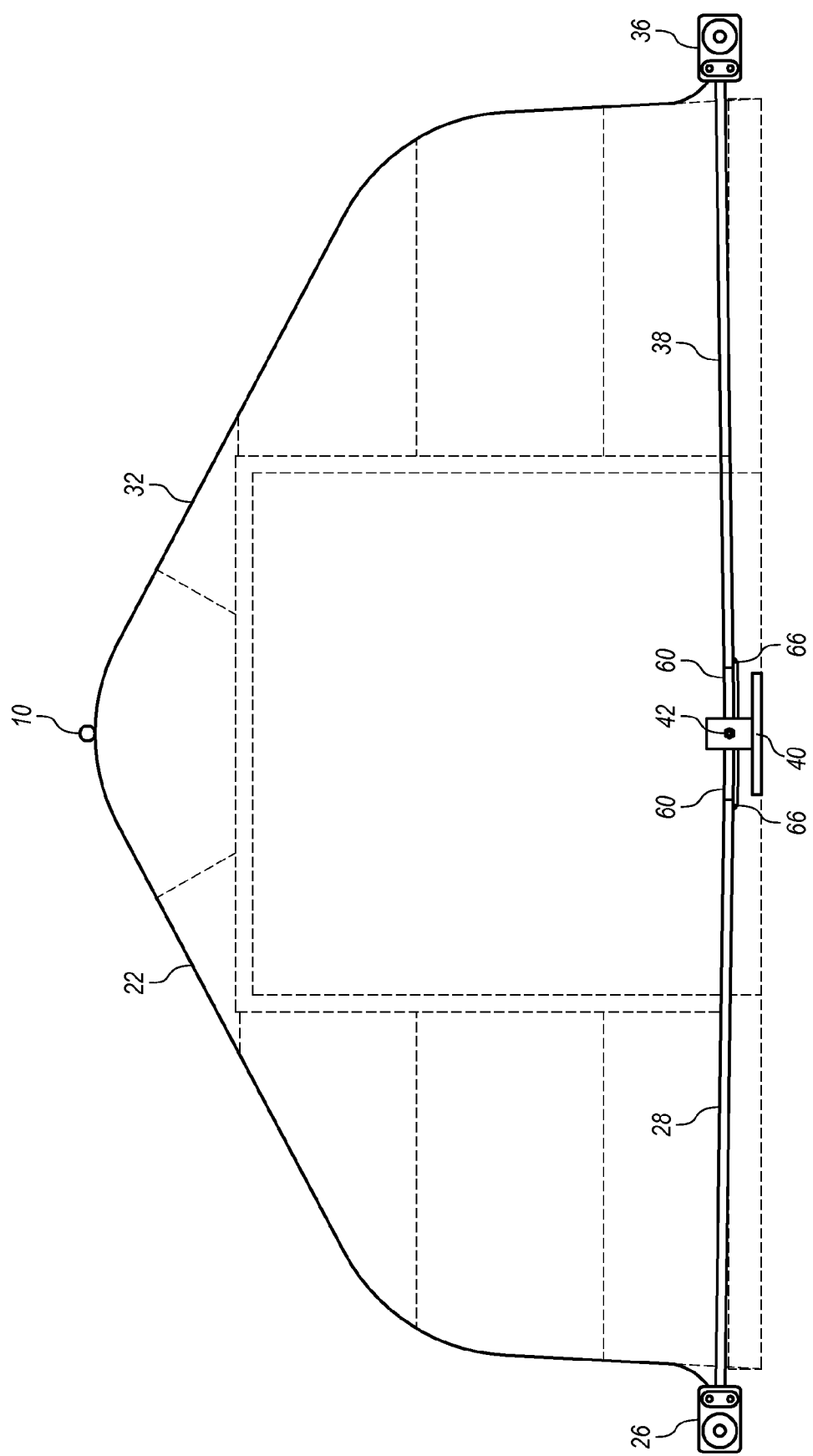
FIG. 10 is a front elevation view of top furling automated retractable greenhouse cover installed over a Semi-Gabled or straight sidewall greenhouse with the cover or curtain fully extended and unfurled.
Figure 11:
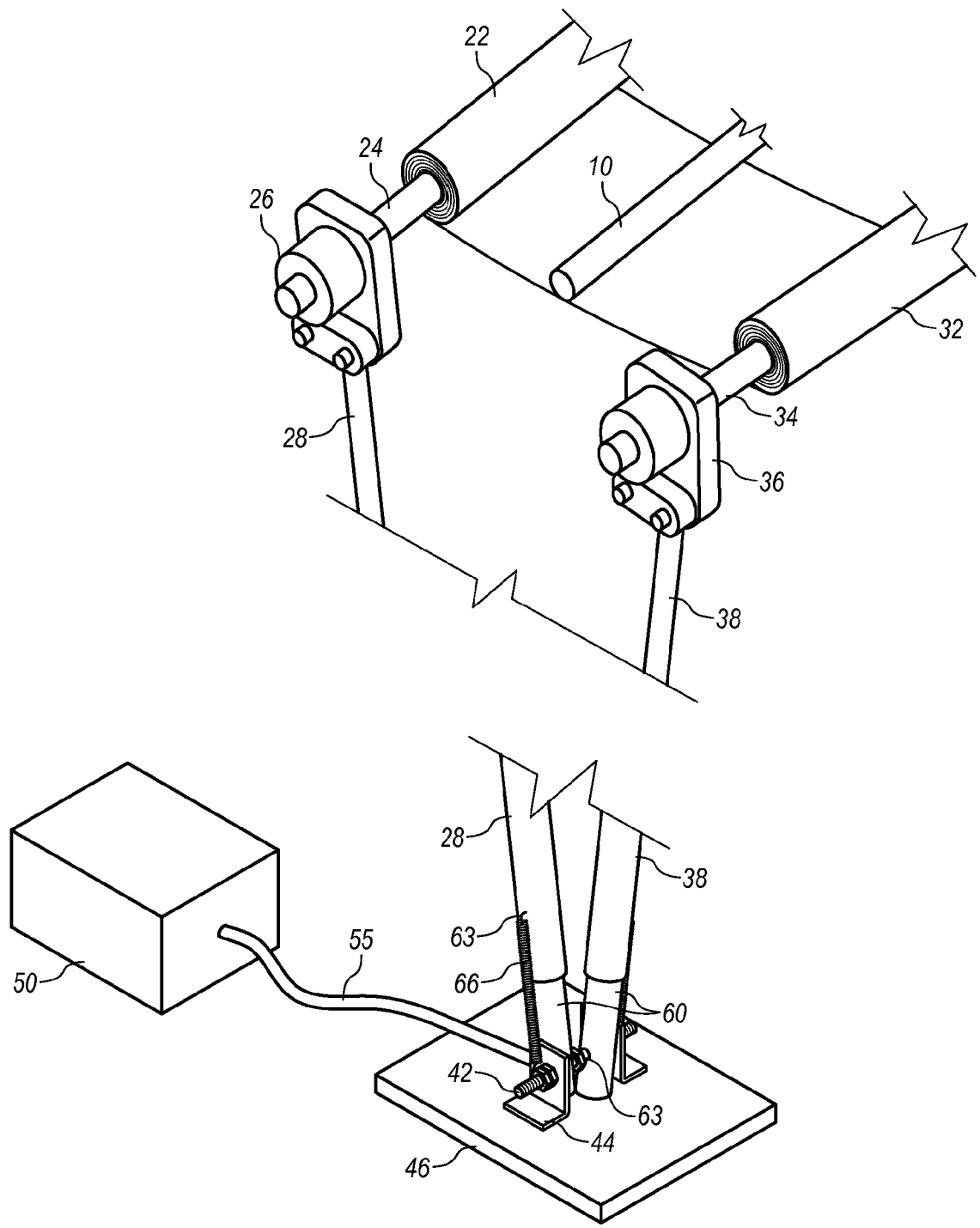
FIG. 11 is a blowup view of the top ends of left support arm and right support arm and a blowup view of the bottom ends of left support arm and right support arm.

| Term | Definition |
| --- | --- |
| 5 | Top Furling Automated Retractable Greenhouse Cover |
| 10 | Spine Clamp |
| 20 | Left Furling Cover Assembly |
| 22 | Left Cover or Curtain |
| 24 | Left Furling Rod |
| 26 | Left Furling Motor |
| 28 | Left Support Arm |
| 29 | Hinge Pin Socket |
| 30 | Right Furling Cover Assembly |
| 32 | Right Cover or Curtain |
| 34 | Right Furling Rod |
| 36 | Right Furling Motor |
| 38 | Right Support Arm |
| 39 | Hinge Pin Socket |
| 40 | Hinge Pin Assembly |
| 42 | Hinge Pin |
| 44 | Hinge Pin Bracket |
| 46 | Bracket Base |
| 50 | Electrical Control Box |
| 55 | Electrical Wiring |
| 60 | Support Arm Extension |
| 63 | Hinge Pin Socket |
| 66 | Support Arm Extension Spring |
| 100 | Existing Greenhouse |

DETAILED DESCRIPTION OF THE INVENTION

Top furling automated retractable greenhouse cover 5 comprises: a spine clamp 10, a left furling cover assembly 20, a right furling cover assembly 30, a hinge pin assembly 40, and an electrical control box 50. Top furling automated retractable greenhouse cover 5 attaches to an existing greenhouse 100 to provide an automated retractable cover or curtain extending over the roof and sidewalls of the existing greenhouse 100. Existing greenhouse 100 may have its own greenhouse cover (not depicted), in which case the top furling automated retractable greenhouse cover 5 provides a second exterior cover or curtain over the roof and sidewalls of the greenhouse 100. Alternately, existing greenhouse 100 may not have a cover and consist of a frame only (as depicted) in which case the top furling automated retractable greenhouse cover 5 provides a singular exterior cover or curtain over the roof and sidewalls of the greenhouse 100.

Left furling cover assembly 20 comprises: a left cover or curtain 22, a left furling rod 24, a left furling motor 26, and a left support arm 28. Left curtain or cover 22 is a rectangular sheet of flexible material with a right edge, a left edge, a top edge, and a bottom edge. The rectangular sheet has a length that is about 0.5-10 feet longer than that of greenhouse 100 and a width of about that of the greenhouse 100. Thus, any length and/or width greenhouse can be accommodated with this invention. The right and left edges are the widths of the rectangular sheet and the top and bottom edges are the lengths rectangular sheet. Flexible material may be permeable to the wind, rain, weather, and the like. Flexible material may be impermeable to the wind, rain, weather, and the like. Flexible material may be insulated or uninsulated. Flexible material may be completely transparent to transmit all sunlight or translucent to partially block sunlight. Flexible material may be completely opaque to block all sunlight from passing through it. Flexible material must be weather resistant and capable of surviving extended exposure to sun, wind, rain, weather, and the like without degrading. Flexible material may be made of any known material such as plastic material, woven fabric, nonwoven fabric, flexible sheet material, composite, quilting, blanketing, insulation, extrusion, or coextrusion.

Left furling rod 24 is a rigid or semi-rigid cylindrical member with a first end and a second end. Cylindrical member may be solid or hollow. The length of the cylindrical member should be about 0.5-10 feet longer than the length of the existing greenhouse 100 to be covered. Cylindrical member must be sturdy, strong, and capable of supporting hundreds of pounds of weight without breaking, cracking or deforming. Cylindrical member may be made of any known material such as metal, plastic, composite, wood, or ceramic.

Left furling motor 26 is an electric motor with a housing and a driveshaft. An electric motor is an electrically powered rotary device that rotates a driveshaft when electrically powered. One end of the driveshaft is located within the housing of the motor and the other end of the driveshaft extends out of the housing. When an electric motor is electrically powered on, the driveshaft rotates while the housing remains stationary. Left furling motor 26 is capable of rotating its driveshaft in a specific amount of revolutions in the counterclockwise direction when a certain electronic command is received. Left furling motor 26 is capable of rotating its driveshaft in a specific amount of revolutions in the clockwise direction when another electronic command is received. The first end of left furling rod 24 is rigidly attached end-to-end and parallel to the exposed end of the driveshaft of left furling motor 26 so that left furling rod 24 rotates commensurately and in unison with the driveshaft of the left furling motor 26. Rigid attachment of left furling rod 24 to the exposed end of the driveshaft may be accomplished by any known means such as clamping, welding, gluing, soldering, bolting, or screwing.

Left furling motor 26 is capable of receiving a 'furl signal' from electrical control box 50 and, in response, furl the left cover or curtain 22 from the unfurled position into the furled, retracted position and to stop furling upon reaching a set position of the furled roll. If left furling motor 26 receives a 'furl signal' when it is already in the furled position, it disregards the furl signal and does nothing. Left furling motor 26 is capable of receiving a 'unfurl signal' from electrical control box 50 and, in response, unfurl the left cover or curtain 22 from the furled position into the unfurled extended position and to stop unfurling upon reaching a set position of the unfurled roll. If left furling motor 26 receives a 'unfurl signal' when it is already in the extended position it disregards the unfurl signal and does nothing.

The left furling motor 26 and the left furling rod 24 are supported above the ground by the left support arm 28. Left support arm 28 is a rigid or semi-rigid cylindrical member with a bottom end and a top end. Cylindrical member may be solid or hollow. The length of the cylindrical member should be about 0.5-10 feet longer than the height of the existing greenhouse 100 to be covered. The top end of left support arm 28 is rigidly attached to the housing of left furling motor 26. Rigid attachment may be accomplished by any known means such as such as clamping, welding, gluing, soldering, bolting, or screwing. The bottom end of left support arm 28 has a hinge pin socket 63. Hinge pin socket 63 is a cylindrical hole through left support arm 28 that is perpendicular to the longitudinal axis of left support arm 28. The inner diameter of hinge pin socket 63 is sized to form a slip fit with the outer diameter of hinge pin 42. The bottom end of left support arm 28 is pivotally attached to hinge pin assembly 40 with hinge pin 42 positioned through hinge pin socket 63.

Right furling cover assembly 30 comprises: a right cover or curtain 32, a right furling rod 34, a right furling motor 36, and a right support arm 38. Right curtain or cover 32 is a rectangular sheet of flexible material with a right edge, a left edge, a top edge, and a bottom edge. The rectangular sheet has a length that is about 0.5-10 feet longer than that of greenhouse 100 and a width of about that of the greenhouse 100. The right and left edges are the widths of the rectangular sheet and the top and bottom edges are the lengths rectangular sheet. Flexible material may be permeable to the wind, rain, weather, and the like. Flexible material may be impermeable to the wind, rain, weather, and the like. Flexible material may be insulated or uninsulated. Flexible material may be completely transparent to transmit all sunlight or translucent to partially block sunlight. Flexible material may be completely opaque to block all sunlight from passing through it. Flexible material must be weather resistant and capable of surviving extended exposure to sun, wind, rain, weather, and the like without degrading. Flexible material may be made of any known material such as plastic material, woven fabric, nonwoven fabric, flexible sheet material, composite, quilting, blanketing, insulation, extrusion, or coextrusion.

Right furling rod 34 is a rigid or semi-rigid cylindrical member with a first end and a second end. Cylindrical member may be solid or hollow. The length of the cylindrical member should be about 0.5-10 feet longer than the length of the existing greenhouse 100 to be covered. Right and left furling rods 24,34 have equal lengths. Cylindrical member must be sturdy, strong, and capable of supporting hundreds of pounds of weight without breaking, cracking or deforming. Cylindrical member may be made of any known material such as metal, plastic, composite, wood, or ceramic.

Right furling motor 36 is an electric motor with a housing and a driveshaft. An electric motor is an electrically powered rotary device that rotates a driveshaft when electrically powered. One end of the driveshaft is located within the housing of the motor and the other end of the driveshaft extends out of the housing. When an electric motor is electrically powered on, the driveshaft rotates while the housing remains stationary. Right furling motor 36 is capable of rotating its driveshaft in a specific amount of revolutions in the clockwise direction when a certain electronic command is received. Right furling motor 36 is capable of rotating its driveshaft in a specific amount of revolutions in the counterclockwise direction when another electronic command is received. The first end of right furling rod 34 is rigidly attached end-to-end and parallel to the exposed end of the driveshaft of right furling motor 36 so that right furling rod 34 rotates commensurately and in unison with the driveshaft of the right furling motor 36. Rigid attachment of right furling rod 34 to the exposed end of the driveshaft may be accomplished by any known means such as clamping, welding, gluing, soldering, bolting, or screwing.

Right furling motor 36 is capable of receiving a 'furl signal' from electrical control box 50 and, in response, furl the right cover or curtain 32 from the unfurled position into the furled retracted position and to stop furling upon reaching a set position of the furled roll. If right furling motor 36 receives a 'furl signal' when it is already in the furled position, it disregards the furl signal and does nothing. Right furling motor 36 is capable of receiving a 'unfurl signal' from electrical control box 50 and, in response, unfurl the right cover or curtain 32 from the furled position into the unfurled extended position and to stop unfurling upon reaching a set position of the unfurled roll. If right furling motor 36 receives a 'unfurl signal' when it is already in the extended position, it disregards the unfurl signal and does nothing.

The right furling motor 36 and the right furling rod 34 are supported above the ground by the right support arm 38. Right support arm 38 is a rigid or semi-rigid cylindrical member with a bottom end and a top end. Cylindrical member may be solid or hollow. The length of the cylindrical member should be about 0.5-10 feet longer than the height of the existing greenhouse 100 to be covered. The top end of right support arm 38 is rigidly attached to the housing of right furling motor 36. Attachment may be accomplished by any known means such as such as clamping, welding, gluing, soldering, bolting, or screwing. The bottom end of right support arm 38 has a hinge pin socket 63. Hinge pin socket 63 is a cylindrical hole through right support arm 38 that is perpendicular to the longitudinal axis of right support arm 38. The inner diameter of hinge pin socket 63 is sized to form a slip fit with the outer diameter of hinge pin 42. The bottom end of right support arm 38 is pivotally attached to hinge pin assembly 40 with hinge pin 42 positioned through hinge pin socket 63.

Hinge pin assembly 40 comprises: a hinge pin 42 and at least one hinge pin bracket 44. Hinge pin assembly 40 pivotally attaches the bottom ends both the left and right support arms 28,38 to the ground. Pivotal attachment of both support arms 28 and 38 can be accomplished with one hinge pin assembly 40 located at one end of greenhouse 100. Hinge pin 42 is a rigid cylindrical member. Hinge pin 42 is a pin for a pivotal bearing. Hinge pin 42 must be made of sturdy material able to withstand large amounts of pressure without defecting or bending. The outer diameter of hinge pin 42 should be sized to make a slip fit connection with the inner diameter of hinge pin socket 63 on support arms 28,38. Hinge pin 22 may be made of any known material such as metal, plastic, composite, wood, or ceramic. Hinge pin could be an appropriately sized bolt, screw, rod, bar, rivet, or other fastener. Hinge pin bracket 44 holds hinge pin 42 in a stationary horizontal position about 0.5-8 inches above the ground with its longitudinal axis coincident with that of greenhouse 100. More than one hinge pin bracket may be used for this purpose. Hinge pin 42 is typically positioned in the middle of the doorway on the end of greenhouse 100, but hinge pin 42 could also be positioned in the middle of the opposite end of greenhouse 100 with or without a doorway. Hinge pin bracket 44 can be any known type of bracket. In best mode, hinge pin bracket 44 is a L-shaped bracket. Hinge pin bracket 44 is rigidly attached to the ground or to a bracket base 46 that is rigidly attached to the ground.

Spine clamp 10 is a rigid or semirigid oblong member. Spine clamp 10 has a length that is similar to that of greenhouse 100. Spine clamp 10 functions to rigidly attach both left cover or curtain 22 and right cover or curtain 32 to the exterior of the roof of greenhouse 100. Spine clamp 10 is rigidly attached to the roof of the greenhouse 100 with its longitudinal axis coincident with that of the ridgeline of the greenhouse roof as depicted in the figures. Spine clamp 10 is rigidly attached to the roof using any known means such as fasteners like bolts, screws, rivets, nails, etc. Covers or curtains 22 and 32 are each attached to the spine clamp 10. Left cover or curtain 22 and right cover or curtain 32 could be sandwiched between spine clamp 10 and the exterior of the roof of greenhouse 100 to rigidly attach covers or curtains 22 and 32 to greenhouse 100. Spine clamp 10 could use any known means to rigidly attach to covers or curtains 22 and 32 such one or more longitudinal friction slots in spine clamp 10 into which covers or curtains 22 and 32 are inserted followed by wire spacers to attach covers or curtains 22 and 32 to spine clamp 10 as with Wiggle Wire™ or with fasteners like bolts, screws, rivets, nails, etc.

Electrical control box 50 comprises a timer, computer processor, and/or integrated circuit with electrical continuity with a power source (not depicted) and electrical wiring 55. Electrical wiring 55 has electrical continuity with left furling motor 26 and right furling motor 36. Electrical wiring 55 runs from electrical control box 50 through both the left and right support arms 28,38 to each furling motor 26,36. Electrical control box 50 functions to send electrical power to furling motors 26,36 for the furling motors 26,36 to operate and function. Electrical control box 50 also functions to send electronic signals to furling motors 26,36 to initiate them to furl and/or unfurl. Electrical control box can be programmed to send a furl or unfurl signal to furling motors 26,36 to cause them to furl or unfurl at any time of day. Furling causes both left and right covers or curtains 22,32 to retract simultaneously. Unfurling causes both left and right covers or curtains 22,32 to extend into covered position simultaneously. The automatic furling and unfurling of the covers or curtains 22,32 is the automated aspect of the invention.

To install top furling automated retractable greenhouse cover 5 on a greenhouse 100, the hinge pin assembly 40 is installed on ground at one end of greenhouse 100 as described above. The spine clamp is attached to the roof of greenhouse 100 as described above. The left furling rod 24 is positioned on the left side of greenhouse 100 parallel to the longitudinal axis of the greenhouse 100 with the ends of each in alignment while simultaneously positioning the hinge pin socket 63 on the attached left support arm 28 into hinge pin assembly 40 and placing hinge pin 42 through hinge pin socket 63 on the left support arm 28. The right furling rod 34 is positioned on the right side of greenhouse 100 parallel to the longitudinal axis of the greenhouse 100 with the ends of each in alignment while simultaneously positioning the hinge pin socket 63 on the attached right support arm 38 into hinge pin assembly 40 and placing hinge pin 42 through hinge pin socket 63 on the right support arm 38. The right edge of left cover or curtain 22 is rigidly attached to spine clamp 10. The left edge of left cover or curtain 22 is rigidly attached to left furling rod 24. The left edge of right cover or curtain 32 is rigidly attached to spine clamp 10. The right edge of right cover or curtain 32 is rigidly attached to right furling rod 34. Left and right covers or curtains 22,32 are then carefully wound or furled under tension onto furling rods 24,34. Note that the second end of left furling rod 24 and the second end of right furling rod 34 are not supported or attached to a support arm so the seconds ends of furling rods 24,34 just rest on the top of greenhouse 100 as depicted. Gravity pulls these ends down until tension from covers or curtains 22,32 suspends them from spine clamp 10, so to speak.

A major benefit to the top furling design is that gravity may be used to continuously apply tension between the attached ends of covers or curtains 22,32 and the furling roll as furling roll is furled and unfurled. The use of gravity is free for the use in this regard. Tension between the ends of a sheet and a winding roll of itself is beneficial because tension keeps the sheet free wrinkles or folds and allows for a tighter roll of sheeting that is easier to move and provides better protection for the sheeting. The top furling design of this invention uses gravity to help furl and unfurl a tightly wound rolls of cover or curtain material 22,32.

Most greenhouses 100 are Quonset style and thus have rounded sidewalls. It is easier to furl and unfurl a cover or curtain 22,32 over a rounded sidewall. Other greenhouses are semi-gabled and thus have more straight sidewalls. It is more difficult to furl and unfurl a cover or a curtain 22,32 over a straight sidewall. The straighter the sidewall, the more of a cornered transition between the sidewall and the roof of the greenhouse. It is more difficult to furl and unfurl around a corner than to do so around a rounded area.

To make furling and unfurling around corners easier, the left support arm 28 and the right support arm 38 are not each directly pivotally attached to hinge pin assembly 40 as described above but rather are each slideably attached to a support arm extension 60 and a support arm extension spring 66, which are in turn pivotally attached hinge pin assembly 40. Thus, top furling automated retractable greenhouse cover 5 may further comprise: a first and second support arm extension 60 and a first and second support arm extension spring 66. Each support arm extension 60 is a rigid oblong cylindrical member about 0.3-8 feet long with a top end and a bottom end. The top end of each support arm extension 60 is designed to slideably attach to the bottom end of left support arm 28 or to the bottom end of right support arm 38, which are identical to each other. Slideable attachment could be accomplished by a telescopic connection with one member forming a slip fit over the other member as depicted. The bottom end of each support arm extension 60 has a hinge pin socket 63 located therein. Hinge pin socket 63 is a cylindrical hole through support arm extension 60 that is perpendicular to the longitudinal axis of support arm extension 60. The inner diameter of hinge pin socket 63 is sized to form a slip fit with the outer diameter of hinge pin 42. The top end of the first support arm extension 60 is attached to the bottom end of left support arm 28 to form a slideable connection between these members. The top end of the second support arm extension 60 is attached to the bottom end of right support arm 38 to form a slideable connection between these members. Slideable connection may be accomplished by any known means. The bottom end of each support arm extension 60 is pivotally attached to hinge pin assembly 40 with hinge pin 42 positioned through each hinge pin socket 63. Each support arm extension spring 66 is a spring with a top end and a bottom end. The bottom end of each support arm extension spring 66 is attached to the hinge pin 42. The top end of the first support arm extension spring is attached to the hinge pin socket 63 on the bottom end of left support arm 28. The top end of the second support arm extension spring 66 is attached to the hinge pin socket 63 on the bottom end of right support arm 38.

With this configuration and design, furling rods 24,34 may extend around roof sidewall corners of the greenhouse 100 while furling and unfurling around them. Support arms 28,38 slide along support arm extensions 60 to extend the reach of the roll around the corner as the corner pulls the roll away from the hinge pin 42. After passing the corner, support arms 28,38 slide back along support arm extensions 60 to retract the roll back against the sidewalls or roof as the support arm extension springs 66 pull support arms 28,38 back towards the hinge pin 42 to pick up the slack.

What is claimed is:

1. A retractable greenhouse cover assembly comprising:
    a hinge assembly;
    a first arm having a first end and a second end, the first end of the first arm attached to the hinge assembly and configured to rotate about the hinge assembly between a first position and a second position, the first position being closer to an apex of a roof of a greenhouse than the second position;
    a first motor connected to the second end of the first arm;
    a first rod connected to the first motor, the first motor configured to cause the first rod to rotate about the hinge assembly;
    a first cover portion at least partially wound around the first rod when the first arm is in the first position;
    wherein:
        rotation of the first rod in a first direction unwinds the first cover portion from the first rod and causes the first rod to move farther from the apex of the roof of the greenhouse;
        rotation of the first rod in a second direction opposite the first direction winds the first cover portion around the first rod and causes the first rod to move toward the apex of the roof of the greenhouse; and
        the first arm spaces the first motor away from and above the roof of the greenhouse for at least a portion of the rotation of the first arm between the first position and the second position;
    a second arm having a first end and a second end, the first end of the second arm attached to the hinge assembly and configured to rotate about the hinge assembly between a third position and a fourth position, the third position being closer to the apex of the roof of the greenhouse than the fourth position;
    a second motor connected to the second end of the second arm;
    a second rod connected to the second motor, the second motor configured to cause the second rod to rotate; and
    a second cover portion at least partially wound around the second rod when the second arm is in the third position;
    wherein:
        rotation of the second rod in the second direction unwinds the second cover portion from the second rod and causes the second rod to move farther from the apex of the roof of the greenhouse;
        rotation of the second rod in the first direction winds the second cover portion around the second rod and causes the second rod to move toward the apex of the roof of the greenhouse; and
        the second arm spaces the second motor away from and above the roof of the greenhouse for at least a portion of the rotation of the second arm between the third position and the fourth position.

2. The retractable greenhouse cover assembly of claim 1, wherein the first arm is configured to telescope in length.

3. The retractable greenhouse cover assembly of claim 2, wherein the first arm is configured to adjust between a first length and a second length longer than the first length, and wherein the first arm is biased to the first length.

4. The retractable greenhouse cover assembly of claim 1, further comprising a controller configured to actuate the first motor to rotate in the first and second directions in response to a signal from the controller.

5. The retractable greenhouse cover assembly of claim 4, wherein the controller is connected to the first motor via electrical wiring.

6. The retractable greenhouse cover assembly of claim 1, wherein the first rod is positioned adjacent to the ground when the first arm is in the second position and the retractable greenhouse cover assembly is connected to the greenhouse.

7. The retractable greenhouse cover assembly of claim 1, further comprising a clamp connectable to the roof of the greenhouse and being configured to fix a portion of the first cover portion in place with respect to the roof of the greenhouse.

8. The retractable greenhouse cover assembly of claim 7, wherein the clamp is configured to connect to the apex of the roof of the greenhouse.

9. The retractable greenhouse cover assembly of claim 1, wherein the second arm is configured to rotate away from the first arm when the second arm rotates from the third position toward the fourth position along the second direction.

10. The retractable greenhouse cover assembly of claim 1, wherein both the first motor and the first rod are supported by the first arm.

11. The retractable greenhouse cover assembly of claim 1, wherein the first motor is positioned on a side of the first cover portion opposite the roof of the greenhouse when the first cover portion is unfurled.

12. The retractable greenhouse cover assembly of claim 1, wherein the first arm is between 0.5 feet and 10 feet longer than a maximum height of the greenhouse.

13. The retractable greenhouse cover assembly of claim 1, wherein the first end of the first arm and a first end of the second arm are each attached to a common hinge point.

14. The retractable greenhouse cover assembly of claim 1, wherein the first cover portion and the second cover portion comprise separate covers.

15. The retractable greenhouse cover assembly of claim 1, wherein the first direction is a counterclockwise direction and wherein the second direction is a clockwise direction.

16. The retractable greenhouse cover assembly of claim 1, wherein the first and second arms are configured to rotate about the same axis of rotation.

17. A retractable greenhouse cover assembly comprising:
a hinge assembly configured to be fixed in position with respect to a greenhouse;
a first arm having a first end, a second end, and a length, the first end attached to the hinge assembly and configured to rotate about the hinge assembly in a first direction between a first position and a second position, the first arm configured to telescopically adjust the length;
a first motor connected to the second end of the first arm, wherein the first arm spaces the first motor away from and above a roof of the greenhouse such that, for at least a portion of a rotation of the first arm between the first position and the second position, a first distance between the first motor and the hinge assembly is greater than a second distance between the roof and the hinge assembly;
a first rod connected to the first motor, the first motor configured to cause the first rod to rotate;
a first cover portion configured to at least partially wind around the first rod, wherein rotation of the first arm in the first direction causes the first cover portion to unwind from the first rod;
a second arm having a first end and a second end, the first end of the second arm is attached to the hinge assembly, the second arm configured to rotate in a second direction between a third position and a fourth position, the second direction opposite the first direction, the third position being closer to an apex of the roof of the greenhouse than the fourth position;
a second motor connected to the second end of the second arm, wherein the second arm spaces the second motor away from and above the roof of the greenhouse for at least a portion of a rotation of the second arm between the third position and the fourth position;
a second rod connected to the second motor, the second motor configured to cause the second rod to rotate; and
a second cover portion configured to at least partially wind around the second rod, wherein rotation of the second arm in the second direction causes the second cover portion to unwind from the second rod,
wherein the second arm is configured to rotate away from the first arm when the second arm rotates in the second direction from the third position toward the fourth position to unwind the second cover portion from the second rod.

18. The retractable greenhouse cover assembly of claim 17, wherein the first arm further comprises an arm extension hingedly attached to the hinge assembly and a main rod portion slidably connected to the arm extension.

19. The retractable greenhouse cover assembly of claim 18, wherein the first arm comprises a spring attached to the main rod portion and configured to bias the main rod portion toward the hinge assembly to decrease the length of the first arm.

20. The retractable greenhouse cover assembly of claim 17, wherein the first rod extends in a direction perpendicular to the first arm.

21. The retractable greenhouse cover assembly of claim 17, wherein the first motor is positioned farther from the apex of the roof of the greenhouse when the first arm is in the second position than when the first arm is in the first position, and wherein the first motor is configured to disregard a signal to unfurl the first cover portion if the first arm is in the second position.

22. The retractable greenhouse cover assembly of claim 17, wherein the first arm is rigid.

23. The retractable greenhouse cover assembly of claim 17, wherein the first arm is biased toward a decreased length.

24. The retractable greenhouse cover assembly of claim 17, wherein the first arm is configured to increase in length to facilitate passage of the first rod about a corner of the greenhouse.

25. The retractable greenhouse cover assembly of claim 17, wherein the second arm is configured to increase in length to facilitate passage of the second rod about a corner of the greenhouse.

26. The retractable greenhouse cover assembly of claim 17, wherein the first cover portion and the second cover portion comprise separate covers.

27. The retractable greenhouse cover assembly of claim 17, wherein the first direction is a counterclockwise direction and wherein the second direction is a clockwise direction.

28. The retractable greenhouse cover assembly of claim 17, wherein the first and second arms are configured to rotate about the same axis of rotation.

29. A retractable greenhouse cover assembly comprising:
a hinge assembly;
a first rigid connection means connected to the hinge assembly;
a first cover furling means connected to an end of the first rigid connection means opposite the hinge assembly, wherein the first rigid connection means spaces the first cover furling means away from and above a roof of a greenhouse for at least a portion of a rotation of the first rigid connection means between a first position and a second position;
a first rod connected to the first cover furling means;
a first cover portion at least partially furled about the first rod;
a second rigid connection means; and
a second cover furling means connected to an end of the second rigid connection means opposite the hinge assembly, the second cover furling means coupled with a second rod and a second cover portion at least partially furled about the second rod, wherein the second rigid connection means spaces the second cover furling means away from and above the roof of the greenhouse for at least a portion of a rotation of the second rigid connection means between a third position and a fourth position;

wherein the first cover furling means is configured to furl the first cover portion as the first cover furling means moves away from the ground;

wherein the first cover furling means is configured to unfurl the first cover portion as the first cover furling means moves toward the ground;

wherein the second cover furling means is configured to furl the second cover portion as the second cover furling means moves away from the ground and towards the first cover furling means;

wherein the second cover furling means is configured to unfurl the second cover portion as the second cover furling means moves toward the ground and away from the first cover furling means.

30. The retractable greenhouse cover assembly of claim 29, wherein the first cover furling means is configured to be pulled by gravity to increase tension in the first cover portion.

31. The retractable greenhouse cover assembly of claim 29, wherein the first rigid connection means is configured to telescope.

32. The retractable greenhouse cover assembly of claim 29, wherein the first cover furling means is positioned on a side of the first cover portion opposite the roof when the first cover portion is unfurled.

33. The retractable greenhouse cover assembly of claim 29, wherein the first cover portion and the second cover portion comprise separate covers.

* * * * *